(12) United States Patent
Wehtje

(10) Patent No.: US 6,365,275 B1
(45) Date of Patent: Apr. 2, 2002

(54) POLYSTYRENE BEADS

(75) Inventor: Erik W. Wehtje, Greenwich, CT (US)

(73) Assignee: Polysource, Inc., Greenwich, CT (US)

( * ) Notice: Subject to any disclaimer, the term of this patent is extended or adjusted under 35 U.S.C. 154(b) by 0 days.

(21) Appl. No.: 09/664,521

(22) Filed: Sep. 18, 2000

Related U.S. Application Data

(62) Division of application No. 08/991,297, filed on Dec. 16, 1997, now Pat. No. 6,218,002.

(51) Int. Cl.[7] ................................................ B32B 5/16
(52) U.S. Cl. ........................................ 428/402; 428/407
(58) Field of Search ............................... 428/403, 407, 428/402

(56) References Cited

U.S. PATENT DOCUMENTS

| | | | |
|---|---|---|---|
| 3,074,543 A | 1/1963 | Stanley | 206/46 |
| 3,481,455 A | 12/1969 | Graham et al. | 206/46 |
| 3,856,719 A | 12/1974 | Miyamoto et al. | 87/2 |
| 3,869,295 A | 3/1975 | Bowles et al. | 106/90 |
| 3,887,754 A | 6/1975 | Walter | 428/407 |
| 3,903,023 A | 9/1975 | Boutillier et al. | 264/54 |
| 4,040,855 A | 8/1977 | Rady-Pentek et al. | 106/90 |
| 4,104,440 A | 8/1978 | Collins | 428/402 |
| 4,128,975 A | 12/1978 | Abate | 52/125 |
| 4,169,179 A | 9/1979 | Bussey | 425/159 |
| 4,243,717 A | 1/1981 | Gahmig | 428/402 |
| 4,247,649 A | 1/1981 | Damiens | 521/55 |
| 4,426,065 A | 1/1984 | Komatsuzaki et al. | 264/45.9 |
| 4,485,193 A * | 11/1984 | Rubens et al. | 521/58 |
| 4,525,484 A * | 6/1985 | Hahn et al. | 521/56 |
| 4,698,367 A * | 10/1987 | Ikeda et al. | 521/57 |
| 5,267,845 A | 12/1993 | Anderlind et al. | 425/71 |
| 5,308,396 A | 5/1994 | Kovacs | 106/677 |
| 5,573,790 A | 11/1996 | Wehtje et al. | 425/404 |
| 5,596,045 A * | 1/1997 | Scherzer et al. | 525/241 |
| 5,916,681 A | 6/1999 | Cipin | 428/403 |
| 5,977,195 A * | 11/1999 | Craig et al. | 521/78 |

FOREIGN PATENT DOCUMENTS

| | | |
|---|---|---|
| DE | 195489522 | 11/1996 |
| EP | 0554705 A | 8/1993 |
| GB | 1577542 | 10/1980 |
| JP | 60-13825 | 1/1995 |

\* cited by examiner

*Primary Examiner*—Hoa T. Le
(74) *Attorney, Agent, or Firm*—Fitzpatrick, Cella, Harper & Scinto

(57) ABSTRACT

Substantially cylindrical unexpanded polystyrene beads with a diameter on the order of 1 mm and a length on the order of 3 mm are expanded into substantially cylindrical expanded polystyrene beads with a diameter between about 2 and 5 mm, and a length between about 4 and 10 mm. These expanded beads are well suited for use as a substitute for concrete aggregate to make lightweight concrete and concrete construction boards.

9 Claims, 1 Drawing Sheet

POLYSTYRENE BEADS

The present application is a division of application Ser. No. 08/991,297 filed Dec. 16, 1997 now U.S. Pat. No. 6,218,002.

BACKGROUND OF THE INVENTION

1. Field of the Invention

The present invention relates to polystyrene beads and to products made using those beads. More specifically, the invention relates to both unexpanded and expanded polystyrene beads with specific shapes and dimensions that make the beads perform well in particular applications.

2. Description of the Prior Art

Polystyrene beads are well known, and have been used extensively for some time. These beads start out in an unexpanded state, and can be expanded, using known processes such as those disclosed in U.S. Pat. Nos. 5,573,790 and 5,267,845, into expanded polystyrene (EPS) beads. During this process, the beads can be expanded to different extents. The density of the resulting EPS beads can be measured in units of pounds per cubic foot.

Expanded polystyrene beads have previously been available in a number of different shapes and sizes, and used in a variety of applications. For example, small spherical EPS beads have been molded together to form solid polystyrene foam structures. Common sizes for these spherical beads are, for example, 0.5 mm to 1.5 mm. Larger EPS beads have also been used as packing material, or "peanuts", to protect fragile items during shipping. These "peanuts" are known to have, for example, S, H, I, and C shapes, and sizes on the order of 2 to 4 cm. Cylindrical EPS beads measuring 7 mm in diameter by 15 mm in length were used briefly in the 1980s by ceiling texture manufacturers, who shredded the beads and used the particles as filler. These beads were expanded from resin beads measuring about 2 mm in diameter by 5 mm in length.

Until now, however, attempts to use EPS beads as an ingredient in concrete mixes have suffered from serious drawbacks.

Concrete is made by mixing together cement, water and aggregate. Traditionally, the aggregate included a mixture of fine mineral aggregate (e.g., sand) and coarse mineral aggregate (e.g., gravel). One commonly used concrete mix uses 1 cubic foot of cement, 2 cubic feet of sand, 3 cubic feet of gravel, and 5½ gallons of water. When these ingredients are mixed together, the cement begins to set, and it eventually hardens into a strong, solid material.

One drawback of concrete made from these ingredients is that it is very heavy, due in large part to the weight of the aggregate. In certain situations, particularly when the strength of the concrete is not a limiting factor, a lighter concrete would be advantageous.

In the past, attempts were made to make a lightweight concrete by replacing some of the sand and gravel with spherical EPS beads. But these previous attempts failed because the beads tended to agglomerate (i.e., clump together) in the concrete mix, which made it difficult to make uniform pieces of hardened concrete. In addition, the spherical shape of the EPS beads did not bond well to the concrete, which weakened the resulting concrete to an unacceptable degree.

SUMMARY OF THE INVENTION

The present invention provides a polystyrene bead having a particular shape and size that addresses some of the aforementioned problems.

According to one aspect of the present invention, a bead of unexpanded polystyrene with a substantially cylindrical shape is provided. The bead has a diameter between about 0.6 mm and about 1.5 mm, and a length between about 1.8 mm and about 4.5 mm.

According to another aspect of the present invention, a bead of expanded polystyrene with a substantially cylindrical shape is provided. The bead has a diameter between about 2 mm and about 5 mm, and a length between about 4 mm and about 10 mm.

According to another aspect of the present invention, a concrete mix is provided. The concrete mix includes cement and a plurality of substantially cylindrical expanded polystyrene beads as an aggregate. Each of these beads has a diameter between about 2 mm and about 5 mm, and a length between about 4 mm and about 10 mm. Use of the expanded polystyrene beads as an aggregate greatly lessens the weight of concrete forms which incorporate them, such as concrete constructions board made from such concrete mix, without excessive weakening of the forms. Moreover, expanded beads of this size and configuration tend to disperse uniformly in the concrete mix and not to agglomerate. Therefore, beads in accordance with the present invention provide marked advantages in this application when compared with prior beads.

BRIEF DESCRIPTION OF THE DRAWINGS

The above and other features and advantages of the present invention will be apparent from the following detailed description of the preferred embodiments, which is to be read in connection with the accompanying drawings, wherein.

DETAILED DESCRIPTION OF THE PREFERRED EMBODIMENTS

Figure 1:
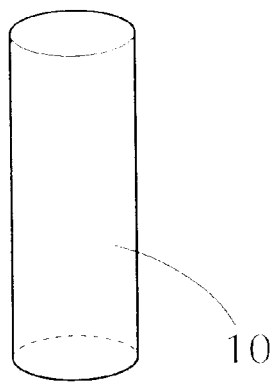
FIG. 1 is a perspective view of an example of an unexpanded polystyrene bead in accordance with the present invention.
Figure 2:
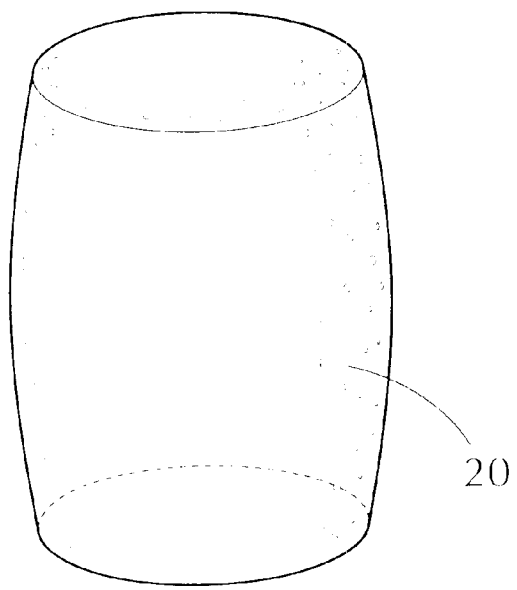
FIG. 2 is a perspective view of an example of an expanded polystyrene bead in accordance with the present invention.

The expanded polystyrene bead shown in FIG. 2 is made by expanding an unexpanded polystyrene bead shown in FIG. 1.

FIG. 1 shows an unexpanded polystyrene bead 10 in accordance with the present invention. Beads such as is shown are substantially cylindrical, and measure between about 0.6 mm and about 1.5 mm in diameter, and between about 1.8 mm and 4.5 mm in length. The most preferred size is about 1 mm in diameter and between about 2.5 and about 3 mm in length. The term substantially cylindrical, as used herein, indicates that the bead approximates a cylinder. Deviations from an ideal cylinder are included within that term, which specifically can encompass, but is not limited to, frustum and barrel shaped deviations, tipped top and bottom faces, and surface defects.

These unexpanded polystyrene beads 10 are ultimately expanded, for example, by apparatuses and methods such as are disclosed in U.S. Pat. Nos. 5,573,790 and 5,267,845 (which are incorporated herein by reference), into expanded polystyrene (EPS) beads.

The resulting EPS beads 20, shown in FIG. 2, are significantly larger than the unexpanded beads from which they were expanded. When the unexpanded polystyrene beads are expanded, the individual beads usually expand to substantially the same extent. When beads with the preferred size mentioned above are expanded to a bulk density of one pound per cubic foot, the resulting EPS beads 20 have diameters from about 2 to about 5 mm and lengths from about 4 to 10 mm in length. Within that range, most of the EPS beads 20 will have diameters from about 3 to about 5 mm and lengths from about 6 to about 9 mm.

When the polystyrene beads are expanded, they maintain their substantially cylindrical shape, as shown in FIG. 2, although with different deviations from an ideal cylindrical shape. For example, the top and bottom faces of the expanded beads 20 may be generally more rounded than the corresponding faces of the unexpanded beads 10.

The EPS beads described above have many advantageous uses. For example, EPS beads in accordance with the present invention can be used as a substitute for a portion of the aggregate that is mixed into concrete. Unlike spherical EPS beads, when EPS beads in accordance with the present invention are mixed into concrete, the beads do not tend to agglomerate in the concrete mixture, and they thereby disperse relatively uniformly throughout the concrete mix. In addition, when the concrete sets, the shape of the EPS beads helps the cement bond to the beads, and causes the beads to interlock with other aggregates in the concrete (such as the sand and gravel). The resulting concrete is significantly lighter than ordinary concrete. It is also no less strong and may be significantly stronger and more uniform than concrete that contains spherical EPS beads.

Concrete made with beads in accordance with the present invention can be cast into excellent concrete construction boards, because the resulting boards are much lighter than their conventional counterparts. Moreover, this type of construction board will be uniform and sufficiently strong for non-load-bearing uses such as ceiling boards and wallboards.

Tests have been performed on concrete construction boards in which 44% of the aggregate was replaced with EPS beads in accordance with the present invention. The resulting concrete construction board had very good structural integrity, and achieved almost a 44% weight reduction, as compared to traditional concrete construction board.

The significant weight reduction achieved by using EPS beads in accordance with the present invention dramatically reduces shipping and freight costs for the concrete board. It also makes the resulting concrete board much easier to handle by workmen and women when it is ultimately installed in a building.

If the EPS beads have a grey color, then the resulting concrete will visually resemble ordinary concrete.

Preferably, all of the EPS beads mixed into the concrete will be the substantially cylindrical beads described above. However, even if some beads with other shapes are included, the substantially cylindrical shaped beads will improve the performance of the resulting concrete.

While the present invention has been described above with reference to the specific preferred embodiments, it is to be understood that the invention is not limited to those precise embodiments. Changes and modifications can be effected to these preferred embodiments without departing from the scope or spirit of the present invention.

What is claimed is:

1. An aggregate precursor particle comprising a bead of unexpanded polystyrene having a substantially cylindrical shape, a diameter between about 0.6 mm and about 1.5 mm, and a length between about 1.8 mm and about 4.5 mm.

2. The aggregate precursor particle according to claim 1, wherein a ratio of the length to the diameter of the bead is between about 2.5:1 and about 3:1.

3. The aggregate precursor particle according to claim 1, wherein the diameter of the bead is about 1 mm, and the length of the bead is between about 2.5 mm and about 3 mm.

4. An aggregate particle comprising a bead of expanded polystyrene having a substantially solid cylindrical shape, a diameter between about 2 mm and about 5 mm, and a length between about 4 mm and about 10 mm, wherein a ratio of the length to the diameter of each said bead is about 2:1.

5. The aggregate particle according to claim 4, wherein a ratio of the length to the diameter of the bead is about 2:1.

6. The aggregate particle according to claim 4, wherein the diameter of the bead is between about 3 mm and about 5 mm, and the length of the bead is between about 6 mm and about 9 mm.

7. The aggregate particle according to claim 4, wherein a ratio of the length to the diameter of the bead is about 2:1, the diameter of the bead is between about 3 mm and about 5 mm, and the length of the bead is between about 6 mm and about 9 mm.

8. The aggregate particle according to claim 4, wherein the bead has a bulk density of about one pound per cubic foot.

9. The aggregate particle according to claim 4, wherein the bead has a grey color.

\* \* \* \* \*